United States Patent [19]

Shahinpoor

[11] Patent Number: 5,389,222
[45] Date of Patent: Feb. 14, 1995

[54] SPRING-LOADED POLYMERIC GEL ACTUATORS

[75] Inventor: Mohsen Shahinpoor, Albuquerque, N. Mex.

[73] Assignee: The United States of America as represented by the United States Department of Energy, Washington, D.C.

[21] Appl. No.: 124,412

[22] Filed: Sep. 21, 1993

[51] Int. Cl.$^6$ .............................................. C25B 9/00
[52] U.S. Cl. ............................ 204/299.2; 204/300 R; 204/180.1
[58] Field of Search ............ 204/180.1, 299 R, 300 R

[56] References Cited

U.S. PATENT DOCUMENTS

| | | | |
|---|---|---|---|
| 4,753,761 | 6/1988 | Suzuki | 264/28 |
| 5,250,167 | 10/1993 | Adolf et al. | 204/180.1 |

OTHER PUBLICATIONS

Kuhn, W. et al., "Reversible Dilation and Contraction by Changing the State of Ionization of High-polymer Acid Networks," Nature, vol. 165, pp. 514–516, Apr. 1, 1950.

Tanaka, T. et al., "Collapse of Gels in an Electric Field," Science, vol. 218, pp. 467–469, Oct., 1982.

Shiga, T. et al. "Deformation of Polyelectrolyte Gels under the Influence of Electric Field," Journal of Applied Polymer Science, vol. 39, pp. 2105–2320, 1990.

Katayama, S. et al., "Phase Transition of a Cationic Gel," Macromolecules, vol. 18, pp. 2781–2782, 1985.

Osada, Y. et al., "Electro-Activated Mechanochemical Devices Using Polymer Gels and Their Application to Artificial Muscle System," Abstract, Bulletin of the Chemical Society of Japan, vol. 67, pp. 3232, 1989.

*Primary Examiner*—John Niebling
*Assistant Examiner*—Cybille Delacroix-Muirheid
*Attorney, Agent, or Firm*—Timothy D. Stanley; George H. Libman

[57] ABSTRACT

Spring-loaded electrically controllable polymeric gel actuators are disclosed. The polymeric gels can be polyvinyl alcohol, polyacrylic acid, or polyacrylamide, and are contained in an electrolytic solvent bath such as water plus acetone. The action of the gel is mechanically biased, allowing the expansive and contractile forces to be optimized for specific applications.

15 Claims, 5 Drawing Sheets

SPRING-LOADED POLYMERIC GEL ACTUATORS

The United States Government has rights in this invention pursuant to Contract Number DE-AC04-76DP00789 between the Department of Energy and the American Telephone and Telegraph Company.

BACKGROUND OF THE INVENTION

There are many computer-controlled actuators available for robotic and related applications. Examples of such actuators include PVDF actuators, piezoelectric actuators, and electroheological fluid actuators. Other common actuators are linear motors, electro-magnetic actuators, hydraulic actuators, pneumatic actuators, and explosive actuators. These prior art actuators suffer from various disadvantages such as size, complexity, high weight and weight/displacement, large power requirements, and high material costs.

It is known that certain co-polymers can be chemically contracted and expanded in electrolytic solutions by varying tile degree of ionization of the solution, or the pH. As originally reported by W. Kuhn. B. Horgitay, A. Katchalsky, and H. Eisenberg, "Reversible Dilation and Contraction by Changing the State of Ionization of High Polymer Acid Networks," Nature, Volume 165. Number 4196, pages 514–516 (1950) a three dimensional network consisting of polyacrylic acid can be obtained by heating a foil of polyacrylic acid containing a polyvalent alcohol such as glycerol or polyvinyl alcohol. The resulting three dimensional networks are insoluble in water but swell enormously in water on the addition of alkali, and contract enormously on the addition of acids. Linear reversible dilations and contractions on the order of more than 400 percent have been observed. Furthermore, the ultimate structural deformation of these gels is homogeneous in the sense that, for example, for a long cylindrical gel, the relative changes of the length and diameter are the same. Similar properties are exhibited by polymethacrylic acid cross-linked by divinyl benzene co-polymerized in methanol.

These effects can also be obtained electrically if a conductor is included in the polymer. Applying a voltage across the polymer gel causes a pH gradient to evolve between the electrodes. A reversible expansion and contraction of the gel is obtained with the application of an electric field. Direct motion control of the polymer is therefore feasible. The behavior of polymeric gels in an electric field is discussed by T. Tanaka. I. Nishio. S. Sun, and S. Ueno-Nishio. "Collapse of Gels in an Electric Field," Science, Volume 218, pages 457–469 (1982). In principle, the devices of the prior art need have only one moving part, the actuating gel itself. There is not the attendant weight and complexity of electric motors or hydraulic pumps and actuators. All that is required is an electric field on the order of a few volts per centimeter. The major disadvantages of such devices are that, in general, the response times of the gels are much longer than conventional actuator components, and there is the inconvenience that the gel must be contained within a solvent bath.

Practical polymeric gel actuators are described by Adolf Segalman, Shahinpoor, and Witkowski in commonly assigned U.S. patent application No. 07/902,322. In these actuators, flexible containers are used to contain the electronic solution while still allowing movement. Electrodes are mounted with the container so that current may be introduced through the electrolytic solution. The ions formed by the current result in changes in the dimensions of the polymeric gel. The dimensional changes of the polymeric gel are converted into mechanical actuation outside the flexible container. Unfortunately, actuator performance is dictated by the parameters of the polymeric gel used.

The forces and rates of expansion and contraction in the actuators described by Adolf et al are dependent on the particular polymeric gel used in the actuator. Although there are a number of polymeric gels suitable for actuators, they represent a limited range of potential actuator parameters. There are gels that expand and contract approximately equally, and gels that exert more contraction force than expansion force. These differing gels are useful in actuators as long as their relative expansion and contraction forces and rates match those desired for the actuator. While the achieved actuator performance characteristics can be modified by varying the size and shape of the gel, the actuator's relative rates and forces remain those of the gel itself. There exists a need for actuators to serve in applications requiring different relative forces or rates than the gels display.

SUMMARY OF THE INVENTION

The present invention relates to electrically controllable polymeric gel actuators. The novel actuators use polymeric gels that can expand and contract under electrical control. The expansion and contraction of a polymeric gel element is converted into mechanical actuation. The mechanical actuation can be biased so that the performance characteristics of the actuator can be tailored for specific applications.

The present invention uses polymeric gels such as polyvinyl alcohol, polyacrylic acid, polyacrylamide, or polyacrylonitrile. These gels react to changes in the ionization of a surrounding electrolyte by expanding or contracting. The disclosed actuators translate this expansion or contraction into motion that can be used for mechanical actuation.

The rate and force of the actuators can be further augmented by a mechanical bias. By way of example, the mechanical biasing mechanism can include a spring resilient material or flexible bands. In one embodiment, the spring can be used to tailor the expansion or contraction of the actuator to the particular needs of the application by preloading the spring so that it augments the gel's action. In this way, polymeric gel actuators can be constructed with a wide range of performance characteristics, making them suitable for a wide range of applications.

The novel actuators use polymeric gels that can expand and contract due to changes in the ionization of an electrolytic solution in contact with the gel. Electric current can be used to change the electrolyte ionization and thereby cause the gel to expand or contract. This content can be introduced in various ways. In one embodiment, a spring is used not only as the biasing mechanism but also as one of the electrodes. In other embodiments the electrodes are part of the container. Introduction of an electric current through the electrolyte causes a change in the ionization of the electrolyte. The gel then expands or contracts. The motion of the gel, opposed or augmented by the mechanical bias, is translated into mechanical actuation. The mechanical operation of the actuator is thus electrically controllable.

These and other advantages of the polymeric gel actuator of the present invention will be best understood by reference to the attached figures and more complete description below.

DETAILED DESCRIPTION OF THE INVENTION

Figure 1:
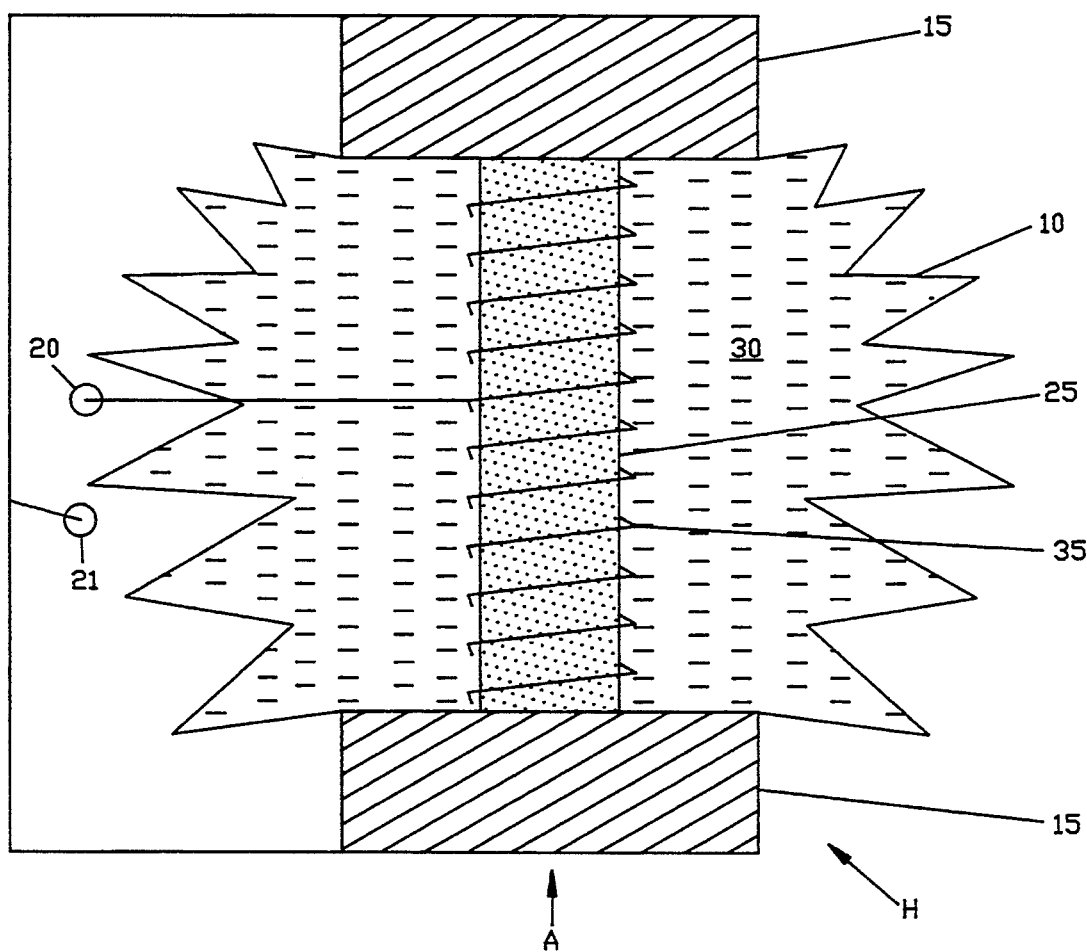
FIG. 1 is a cross-sectional view of a spring-loaded polymeric gel actuator in a contracted state.

FIG. 1 shows a cross-sectional view of a linear actuating embodiment of the present invention. The linear actuator A comprises end caps 15 sealed to a flexible wall 10 forming an enclosed actuator housing It. The flexible wall 10 shown in this embodiment comprises a bellows structure. A polymeric gel element 25 is mounted within the actuator housing H and is coupled to the end caps 15 so that it can apply force to them for actuation as described below. This coupling can be accomplished in various numbers, as will be apparent to those skilled in the art. For example, gel element fibers (not shown) can be threaded through holes (not shown) in the end caps 15 or attached to protrusions (not shown) from the end caps 15. Polymeric gel element 25 can be foraged as a solid structure or as an aggregate of smaller structures, and can be formed of materials such as polyvinyl alcohol, polyacrylic acid, polyacrylamide, or polyacrylonitrile.

An electrolytic solution 30 is contained within the actuator housing H. Electrolytic solution 30 can be any solution capable of ionizing, e.g., water plus acetone. Biasing mechanism 35 is also contained within the actuator housing H and surrounds polymeric gel element 25. The biasing mechanism 35, in this embodiment a spring, can be coupled to the end caps 15 or to the gel element 25 so that it can apply additional force for actuation. Actuator A further comprises electrodes 20, 21 for connections to an external electric source (not shown). In this embodiment, the end caps 15 are connected to a first electrode 21 and the spring 35 is connected to a second electrode 20. Actuator A is shown in a contracted state, where the end caps 15 have been pulled together by polymeric gel element 25 and spring 35.

In FIG. 1, the electrolytic solution 30 is ionized by an electric current introduced through the electrodes 20, 21. This ionization results in the contraction of the polymeric gel element 25, causing it to pull the end caps 15 together. The spring 35, at rest in FIG. 1, contributes to the contraction of actuator A by also pulling the end caps 15. Thus, polymeric gel element 25 and the spring 35 combine to contract actuator A more rapidly and with greater force than could polymeric gel element 25 alone.

Figure 2:
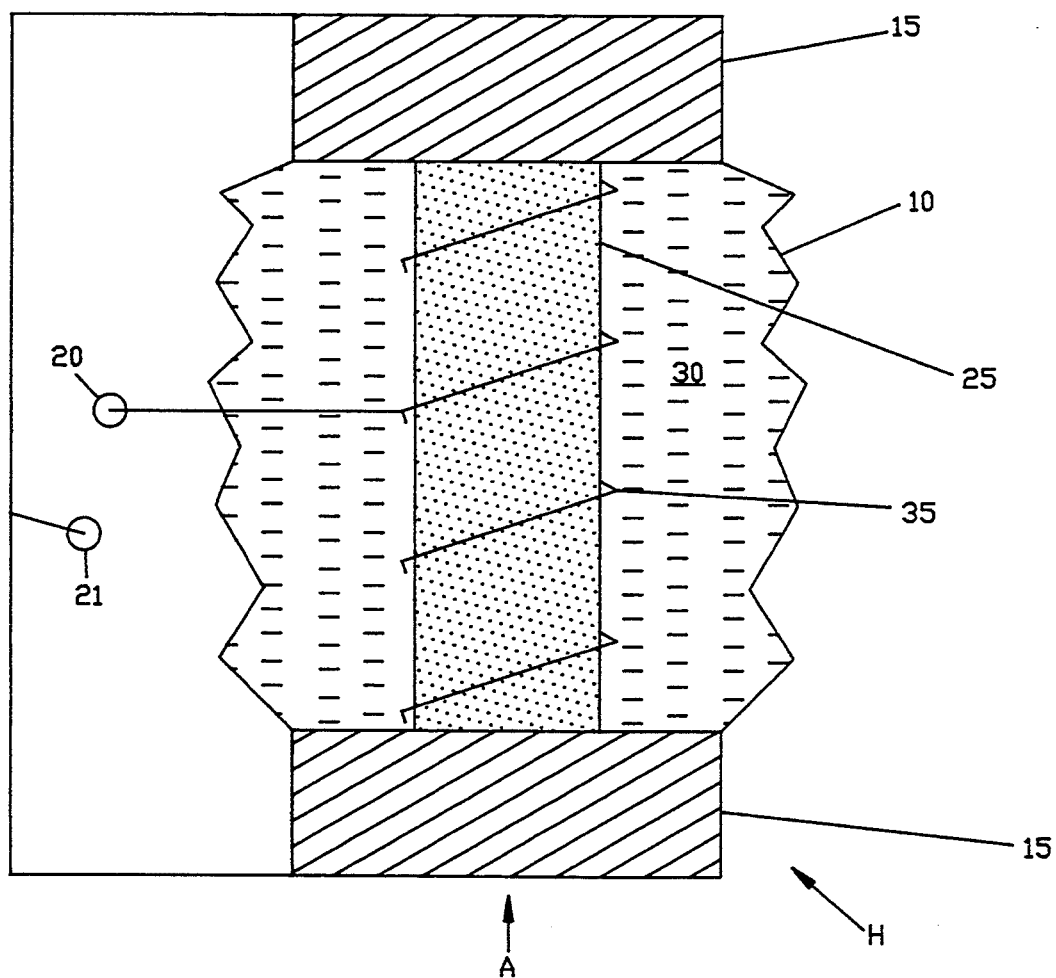
FIG. 2 is a cross-sectional view of a spring-loaded polymeric gel actuator in an expanded state.

In FIG. 2 actuator A is shown expanded. The expansion of actuator A has pushed the end caps 15 apart. An external mechanical system (not shown) can be connected to the end caps 15 and activated by the expansion of actuator A. The ionization of the electrolytic solution 30 in FIG. 2 has been changed from FIG. 1 by reversing the external electric current. This change in ionization results in the expansion of the polymeric gel element 25. In this example, the polymeric gel element 25 must expand against the force of the spring 35, causing actuator A to expand more slowly and with less force than it would with polymeric gel element 25 alone.

Figure 3:
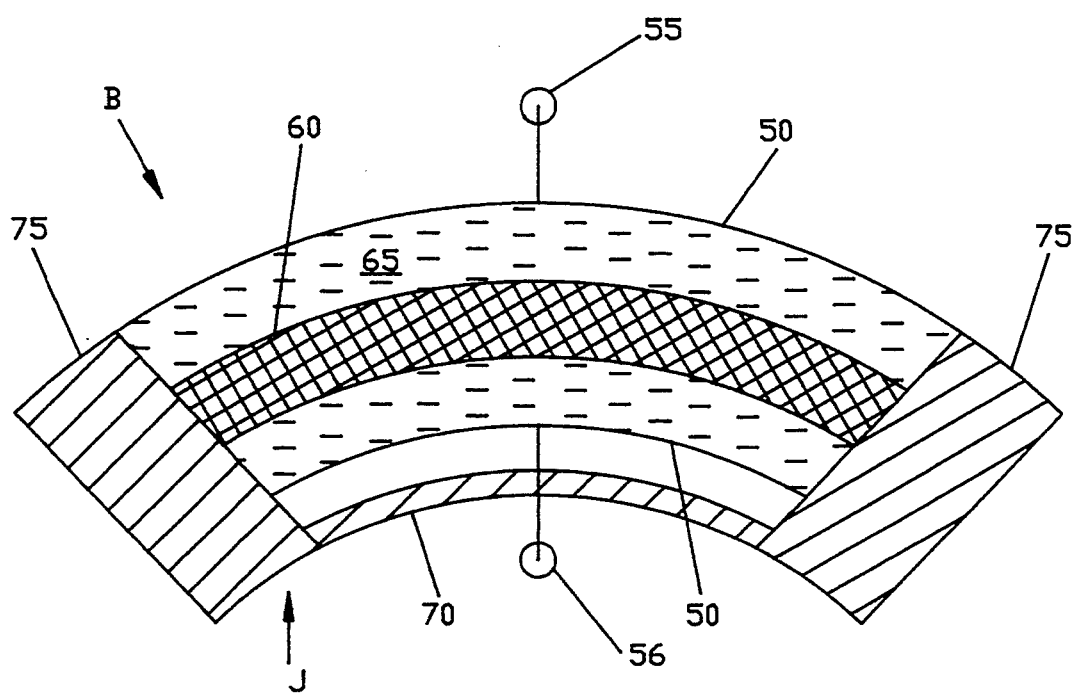
FIG. 3 is a cross-sectional view of an actuator embodiment capable of flexing.

A second embodiment of the present invention capable of flexing is shown in FIG. 3. Actuator B comprises end caps 75 sealed to flexible walls 50 forming enclosed actuator housing J. A planar polymeric gel element 60 is disposed within an electrolytic solution 65 contained in actuator housing J. The polymeric gel element 60 is coupled to the end caps 75 by methods similar to those discussed for actuator A in FIG. 1. Opposing surfaces of flexible wall 50 are connected to electrodes 55, 56 for connections to an external electric source (not shown). A biasing element 70, in this example a sheet of resilient material such as steel, is located outside the actuator housing J and attached to the end caps 75.

Application of a voltage source across the two electrodes 55, 56 causes the electrolytic solution 65 to ionize, with differing polarities of ions concentrated at each electrode 55, 56. The gel near the wall surface 50 connected to one electrode 55 will therefore expand while the gel near the wall surface 50 connected to the other electrode 56 will contract. This differential action results in a flexing of actuator B. The flexion can be reversed by reversing the external electric source. An external mechanical system (not shown) can be connected to the actuator housing J and hence be activated by the flexing motion. The bias element 70 can be chosen to apply force that either opposes part of the flexing motion or that augments it. The combination of the actions of the polymeric gel element 60 and the bias element 70 result in a flexing actuator with tunable flexing force and rates.

Figure 4:
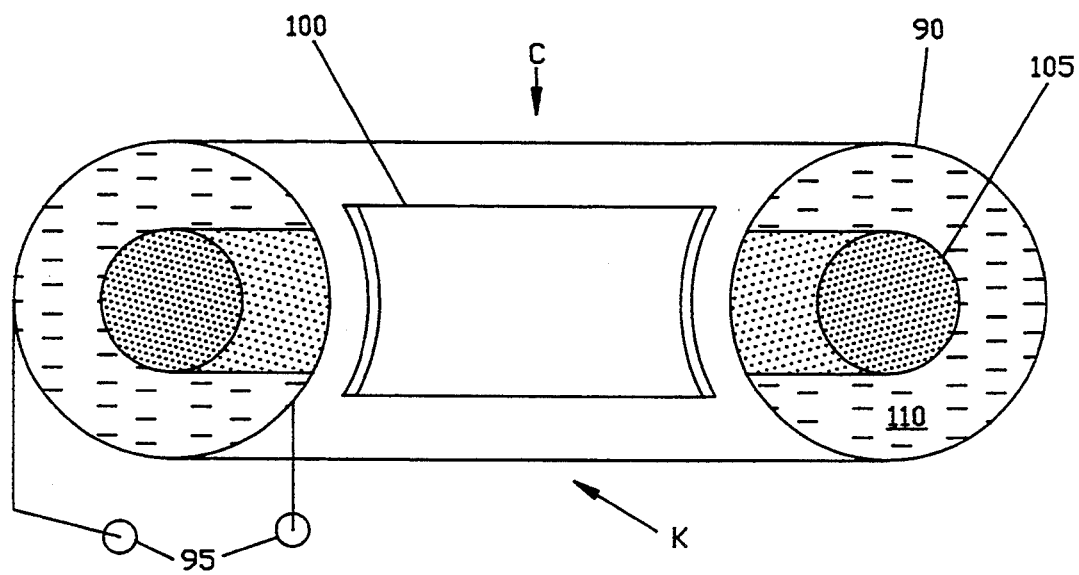
FIG. 4 is a cross-sectional view of an actuator embodiment capable of a splintering action.

Actuator C of FIG. 4 is capable of a splintering action by opening or closing the middle of the annulus under electrical control. The wall 90 of a flexible annular actuator housing K is connected to electrodes 95 for connection to an external electric source (not shown). A polymeric gel element 105 is within the annular actuator housing K. A resilient band 100, mounted in the center opening of the actuator housing K, is a biasing mechanism that can exert force to hold the sphincter open. An electrolytic solution 110 and a toroidal polymeric gel element 105 are contained within the actuator housing K.

Electric current applied to the electrodes 95 will cause ionization of the electrolytic solution 110, resulting in the polymeric gel element 105 contracting and forcing the opening closed against the force of the resilient band 100. Reducing or reversing the ionization results in expansion of the polymeric gel element 105, which combines with the resilient band 100 to widen the central opening. The polymeric gel element 105 and bias mechanism 100 can be chosen to deliver the rates and forces of actuation desired for the intended application.

Figure 5:
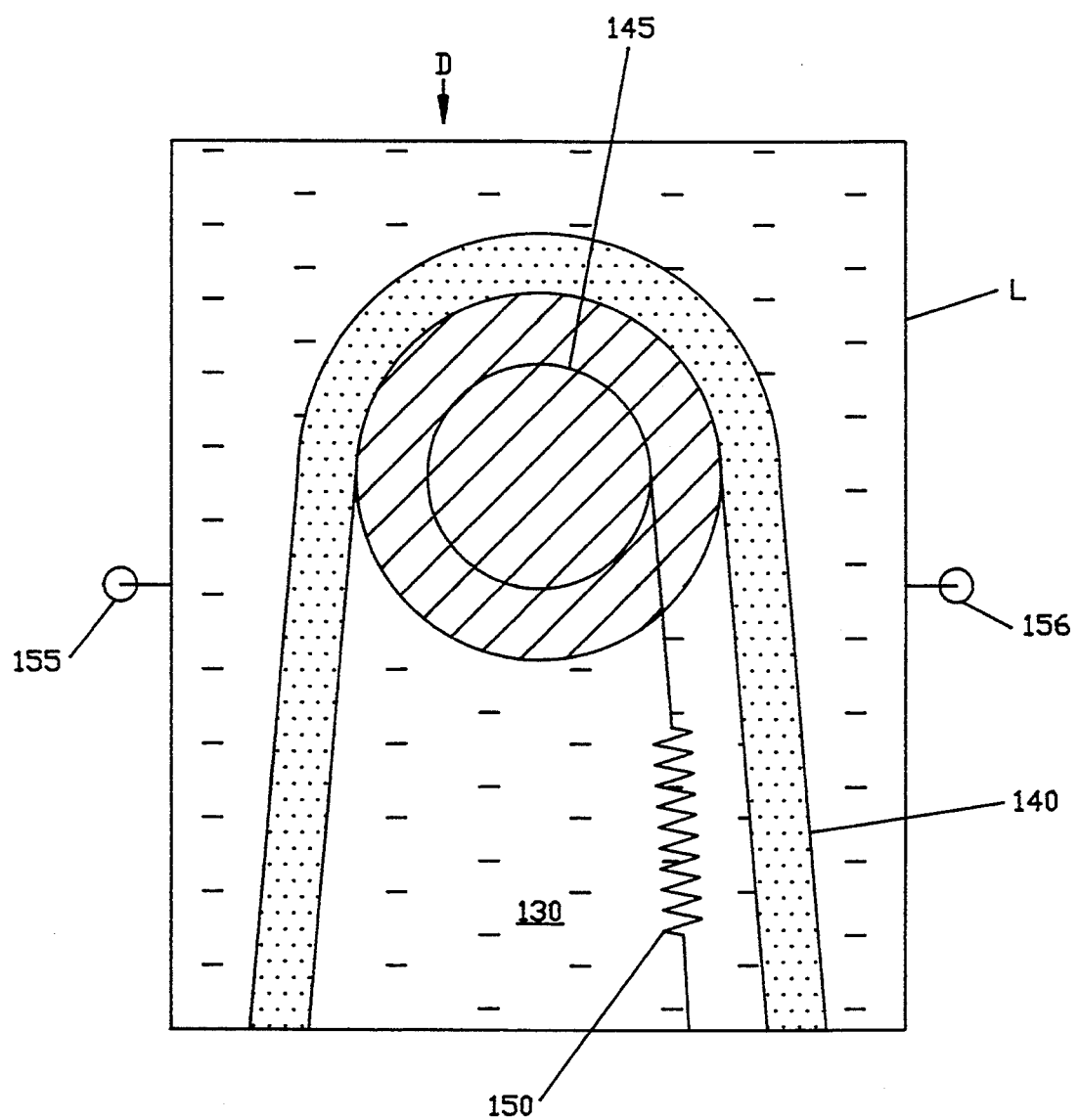
FIG. 5 is a cross-sectional view of an actuator embodiment capable of turning an output shaft.

A cross-sectional view of polymeric gel actuator I) capable of rotating an output shaft is shown in FIG. 5. An electrolytic solution 130 is contained in an inflexible actuator housing L. A polymeric gel element 140 is looped around an output shaft 145. Each end of the polymeric gel element 140 is attached to the actuator housing L in a manner similar to those discussed for actuator A in FIG. 1. Electrodes 155, 156 are mounted with the side walls of the actuator housing L. The biasing mechanism, in this example a spring 150, is mounted with the actuator housing L and connected to the output shaft 145 so the spring 150 can apply a torque to the output shaft 145.

Application of an electric potential across the electrodes 155, 156 will cause the electrolytic solution 130 to ionize, with opposing polarities near the two electrodes 155, 156. The gel nearest one electrode 155 will therefore expand while that nearest the other electrode 156 will contract. This results in a torque being applied to the output shaft 145 in combination with or in opposition to that applied by the spring 150. The output shaft 145 can be connected to an external system and thereby convert the actuator torque and output shaft 145 rotation into external actuation. An alternating electric potential across the two electrodes 155, 156 will result in an oscillating motion of the output shaft 145.

Polymeric gels suitable for use in this invention can be prepared according to several teachings. These include S. Katayama and A. Ohate. Macromolecules, Volume 18, page 1872 (1985); T. Shiga and T. Kurachi, Journal of Applied Polymer Science, Volume 39, page 2305 (1990); Y. Osada, K. Umezowa, and A. Yamauchi. Bulletin of the Chemical Society of Japan, Volume 67, page 3232 (1989); and Suzuki in U.S. Pat. No. 4,753,761 (1988). While the invention contemplates the use of polymeric gel configurations such as sheets or solid shapes, aggregates of fibers with diameters on the order of 10–20 microns are preferred due to their high ratio of surface area to volume and ready exposure to electrolytic solution. This construction reduces the response time of the gel element to changes in the ionization of the electrolytic solution.

A suitable electrolytic solution or use in the invention is a 1.0% by weight solution of salt, such as NaCl, in water. Electrical potential of about 2.0 volts per centimeter between electrodes is suitable for the practice of the invention. Polyethelene and Teflon are suitable materials for the walls of the actuator housing. A catalyst such as platinum can be in the actuator housing to rapidly recombine hydrogen and oxygen produced as a result of electrolysis during ionization of the electrolyte. Biasing mechanisms can be incorporated in various ways, depending on the size, shape, and desired performance of the actuator. Helical springs, resilient materials and flexible bands are examples of suitable biasing mechanisms.

The above description of the present invention offers several example embodiments. Those skilled in the art will appreciate that variations in materials as well as configuration of the gel elements and biasing mechanisms can be made without departing from the scope of the Claims appended hereto.

I claim:

1. A polymeric gel actuator comprising:
   a) a polymeric gel element having initial physical dimensions;
   b) means for changing the dimensions of the polymeric gel element;
   c) means for converting said change in the physical dimensions into mechanical movement; and
   d) means for augmenting a portion of said mechanical movement.

2. The polymeric gel actuator of claim 1, wherein said means for changing the dimensions of the polymeric gel element comprises:
   a) fluid containment means for containing an electrolytic solution;
   b) an electrolytic solution within said fluid containment means with the polymeric gel element immersed therein; and
   c) electrode means for ionizing the electrolytic solution.

3. The polymeric gel actuator of claim 2, wherein said fluid containment means further comprises first and second end caps sealingly engaged with a flexible wall: the polymeric gel element being attached to said first and second end caps.

4. The polymeric gel actuator of claim 3 where said electrode means are mounted with the first and second end caps.

5. The polymeric gel actuator of claim 3, where said electrode means are mounted with said means for augmenting and with the first end cap.

6. A polymeric gel actuator comprising:
   a) a fluid containment means for containing an electrolytic solution;
   b) an electrolytic solution having a first ion concentration within said fluid containment means;
   c) a polymeric gel element having initial physical dimensions disposed within the electrolytic solution;
   d) electrode means for causing a change in the polymeric gel element s dimensions by changing the ion concentration of the electrolytic solution;
   e) means for convening said change in the physical dimensions into mechanical movement; and
   f) means for augmenting a portion of said mechanical movement.

7. The polymeric gel actuator of claim 6, wherein said means for augmenting is located within the fluid containment means.

8. The polymeric gel actuator of claim 6, wherein said fluid containment means further comprises first and second end caps for sealably engaging a flexible wall: the polymeric gel element being attached to said first and second end caps: said means for augmenting being attached to said first and second end caps.

9. The polymeric gel actuator of claim 8, wherein the electrode means is mounted with said first and second end caps.

10. The polymeric gel actuator of claim 8, wherein the electrode means is mounted with the means for augmenting and with the first end cap.

11. A polymeric gel actuator, comprising:
   a) an enclosed actuator housing comprising a flexible wall and first and second end caps sealably mounted therewith;
   b) an electrolytic solution having an ion concentration within the housing;
   c) a polymeric gel element having physical dimensions responsive to changes in the electrolytic solution whereby changes in the ion concentration result in changes in the dimensions of the polymeric gel element; the polymeric gel element connected to the first and second end caps so that changes in the dimensions of the polymeric gel element result in motion of the first end cap relative to the second end cap;
   d) a spring inside the housing, the ends of the spring mounted with the first and second end caps; and
   e) first and second electrodes mounted with the actuator to introduce electrical current through the electrolytic solution.

12. The polymeric gel actuator of claim 11, wherein the first and second electrodes comprise the spring and the one of the end caps, respectively.

13. The polymeric gel actuator of claim 11, wherein the first and second electrodes are mounted on opposing sides of the housing flexible walls.

14. A polymeric gel actuator, comprising:
   a) a flexible annular actuator housing;
   b) an electrolytic solution having an ion concentration contained in the actuator housing:
   c) a polymeric gel element having dimensions responsive to changes in the ion concentration in the electrolytic solution whereby changes in the ion concentration result in changes in the dimensions of the polymeric gel element, the polymeric gel element is disposed within the actuator housing so that contraction of the polymeric gel element can cause the annulus to contract;
   d) first and second electrodes to introduce electrical current through the electrolytic solution and change the ionization of the electrolytic solution, the first electrode mounted with the outer wall of the housing and the second electrode mounted with the inner wall of the housing; and
   e) a resilient member mounted with the housing so that the resilient member can oppose the action of the polymeric gel element.

15. A polymeric gel actuator capable of turning a shaft, comprising:
   a) an actuator housing;
   b) an electrolytic solution contained, Nitlain the actuator housing:
   c) a shaft rotably mounted with the actuator housing;
   d) a polymeric gel element disposed within the housing, the gel clement wrapped around a portion of the shaft, opposing ends of the gel element mounted with the housing, the gel element responsive to changes in the ionization of the electrolytic solution by changes in the dimensions of the gel element;
   e) first and second electrodes for introducing electrical current through the electrolytic solution, where the first electrode is mounted with the housing near one end of the gel element and the second electrode is mounted with the housing near the other end of the gel element so that ions of differing polarities will form near each electrode, causing one end of the gel element to expand and the other end of the gel element to contract, thereby rotating the shaft; and
   f) a spring mounted with the shaft and with the gel element so that the spring biases rotation of the shaft.

* * * * *